Oct. 18, 1932.    W. SCHROEDER    1,882,985
APPARATUS FOR HANDLING MATERIAL
Filed Jan. 11, 1930
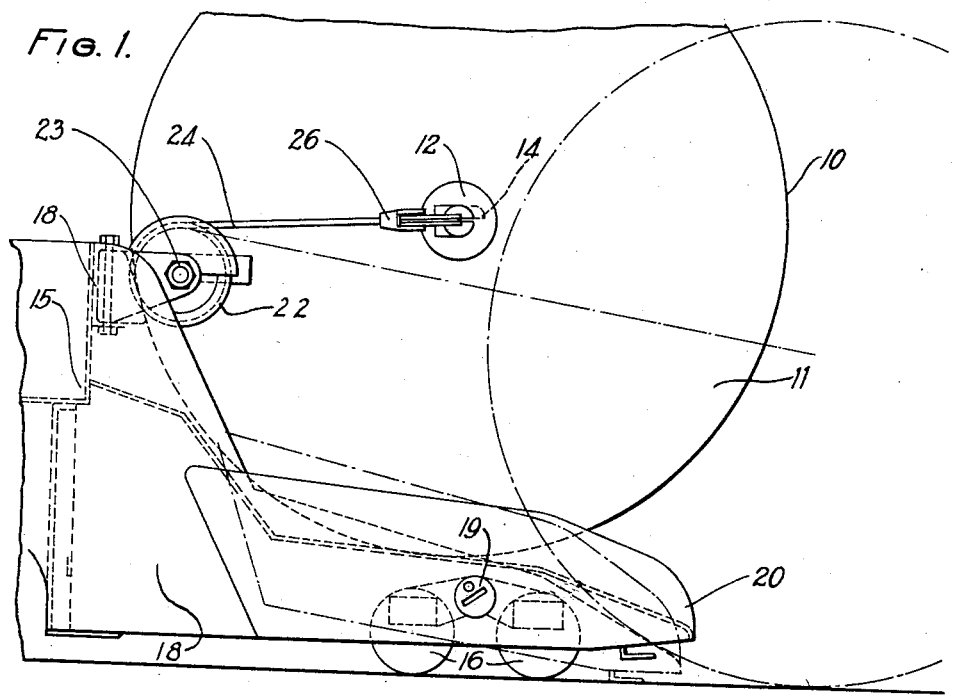
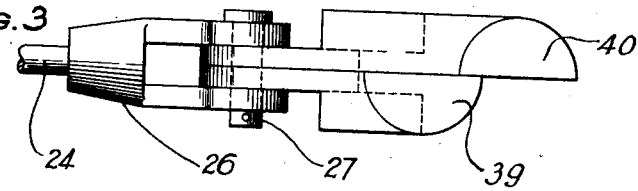
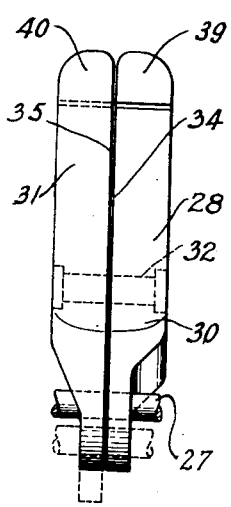
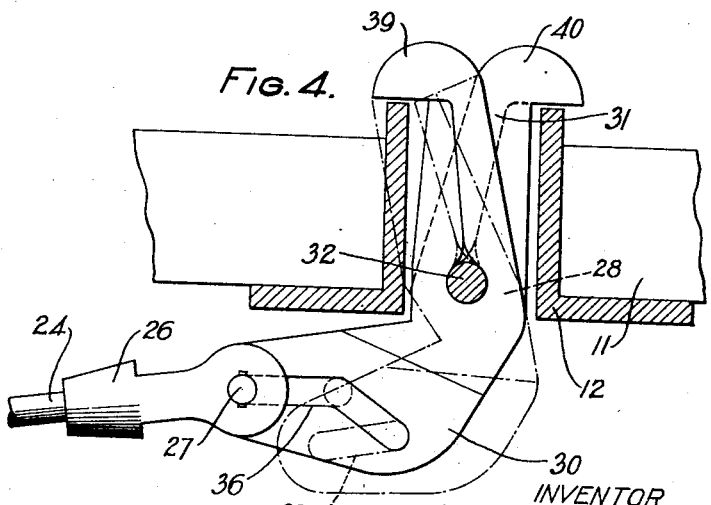
INVENTOR
W. SCHROEDER
BY E. R. Nowlan
ATTORNEY Patented Oct. 18, 1932

1,882,985

UNITED STATES PATENT OFFICE

WILLIAM SCHROEDER, OF ORANGE, NEW JERSEY, ASSIGNOR TO WESTERN ELECTRIC COMPANY, INCORPORATED, OF NEW YORK, N. Y., A CORPORATION OF NEW YORK

APPARATUS FOR HANDLING MATERIAL

Application filed January 11, 1930. Serial No. 420,063.

This invention relates to an apparatus for handling material, and more particularly to an apparatus for handling material upon reels.

It has been a practice in some instances in transporting reels to employ trucks having a windlass and a pair of associated chains by means of which when the chains were secured in the central bushing of the reel, the latter was hauled up an incline to rest upon a level platform of the truck, and, when the truck had arrived at its destination, the reel was allowed to roll down the incline to a position in a storage area. Owing to the relatively great weight of the reels even when unloaded, it has been found desirable especially from a safety standpoint to provide an apparatus for securely connecting the hauling chains to the reel while at the same time permitting free rotation of the latter when it is in motion.

An object of the invention is to provide an apparatus for handling material which will be simple and sturdy of construction and efficient and safe in operation.

One embodiment of my invention contemplates the provision, in an apparatus for handling cable reels, of a pair of plugs, each of which is attached to the end of a hauling chain controlled by individual windlasses, and adapted to be seated in the bushed central aperture of the reel head. Each plug consists of a pair of levers having complemental hooked ends and rotatable about a common fulcrum. A hauling clevis pin, operating in slots in the levers on the other side thereof from the hooked ends, moves the levers from a fully closed and retracted position to an open or expanded position, becoming locked in the latter or reel engaging position by the tension maintained in the hauling chains by the windlasses.

A better understanding of the invention is afforded by the following detailed description, taken in connection with the accompanying drawing forming a part thereof, in which Fig. 1 shows a fragmentary diagrammatic view of a truck showing the apparatus and its application;

Fig. 2 is a fragmentary front view of a reel center plug constructed in accordance with the invention, and shown in retracted position;

Fig. 3 is a top plan view of the reel center plug shown in Fig. 2, in expanded position and Fig. 4 is a fragmentary side elevation of the reel center plug shown in Fig. 2, in expanded position to engage the reel.

Referring now to the drawing, in which identical reference numerals indicate similar parts throughout the several views, a reel 10 of the type commonly used for storing telephone cable is provided with a pair of oppositely disposed reel heads 11. The reel is provided at either side or head with a bushing 12 which reinforces the reel head structure around a central aperture 14 in which it has been common practice to insert a bar extending from side to side of the reel, or a grapple to permit its rotation on being lifted. An industrial truck or other suitable conveyance 15 (Fig. 1), which may be of any conventional type, but preferably of the type disclosed and claimed in my copending application, Serial No. 313,434, filed October 19, 1928, is provided with two pairs of trailer wheels 16—16 mounted in a frame 18 of the truck for the purpose of supporting the reel and providing an incline whereby the loading of the reel upon the truck from ground is facilitated. The frame 18 is divided into upper and lower portions, the lower portion mounting a transverse shaft 19 upon which rests a tiltable loading platform 20 adapted when the truck is properly positioned relative to a reel to be transported to be depressed by the weight of the reel as the latter begins to roll upon the platform, to tilt to a substantially level position when the reel has advanced upwardly of the incline and beyond the transverse shaft 19 and to remain in the level position as the reel is maintained thereon during transportation. Suitably secured to each side of the upper portion of the truck are a pair of windlasses 22—22, of any suitable type, each of which is rotatable upon a shaft 23 for loading and unloading the reel 10 by means of winding cables or chains 24—24. It will be understood that one end of each of the winding cables 24 is wound around the windlasses 22 and the free ends thereof are lengthened or shortened by the rotation of the windlasses in unison, as controlled by the operator.

For attaching the winding cables 24 to the reel, a clevis 26 having a bolt 27 extending transversely through the bifurcated portion thereof is secured to the free end of the cables 24. A reel center plug 28 (Figs. 2, 3 and 4) consists of a pair of elongated L-shaped lever members 30 and 31 of tapering cross-section, which are rotatable about a common fulcrum or shaft 32. The lever members 30 and 31 are composed broadly of two sections, the upper being substantially semi-circular in cross section so that a flat side 34 of the lever member 30 is immediately adjacent a flat side 35 of the lever member 31, to coincide with the general configuration of the central aperture of the reel head. The lower sections of the lever members are substantially rectangular in cross section and considerably less in thickness than the upper semi-circular sections in order that they may both be accommodated in the bifurcated portion of the clevis 26. Each of the lever members is provided in the lower section thereof with a slot for receiving the clevis bolt 27, the lever member 30 having an angular two-way slot 36 and the lever member 31 having a straight one-way slot 38 which is approximately one-half as long as the two-way slot 36, in order to permit a relative movement between the lever members as hereinafter described. The lever members 30 and 31 are provided on the upper extremities thereof with enlarged complemental semi-circular portions or hooks 39 and 40 respectively, for the purpose of engaging the inner surface of the bushing 12 when they are expanded.

To operate the device, one of the reel center plugs 28 is manually inserted within the bushed central aperture 14 on each side of the reel. During this operation the levers are retracted, in other words the complemental semi-circular hooks 39 and 40 coincide along their peripheries, in order to permit their insertion through the bushed aperture, and as will be noted from the dotted line representation shown in Fig. 4 of the drawing, the lower sections of the lever members are expanded. Under these circumstances, the bolt 27 may be seated in the right hand end of both slots 36 and 38. The plug is inserted into the aperture until the lower section of the levers contacts with the exterior of the bushing and the semi-circular hooked portions 39 and 40 are entirely within the bushing so that they may then be expanded to prevent their dislodgement from the aperture. This is accomplished by first sliding the clevis bolt 27 from the right to the left hand end of the one-way slot 38 and to midway of the two-way slot 36. It will be understood that the one-way slot and the right hand half of the two-way slot are radially disposed with reference to the common fulcrum 32 in order that all points therein might be equidistant from the fulcrum 32; accordingly, the sliding bolt may be so positioned without effecting the relative positions of the lever members, and the movement may be executed manually and without difficulty. The operator then pulls the clevis to the left, causing the bolt to seek the left hand end of the two-way slot. Since the clevis bolt 27 had, previous to the latter movement, been seated in the left hand end of the one-way slot, the continued leftward movement of the bolt rotates the lever member 31 in a clockwise direction about the common fulcrum 32, causing the hooked end 40 of the lever member 31 to move away from the hooked end 30 and engage the reel head on the opposite side of the central aperture therefrom.

As soon as the operator ascertains that both hooked portions 39 and 40 are engaged by the bushing 12, which fact is established when the clevis bolt 27 is in the left hand end of the two-way slot 26, the windlasses are operated to wind the cables 24. Continued rotation of the windlasses causes the cables 24 to become taut, causing the reel to roll bodily to the left (Figs. 1 and 4) and upwardly of the incline and to rest upon the platform of the truck, the reel center plugs 28 acting as axial hauling and bearing means for the reel. In this connection it should be noted that in hauling the reel to the left the reel center plug is pulled in that direction and the reel rotates in a counter-clockwise direction, so that the lining of the bushing 12 engages the curved upper section of the lever members, constantly moving away from straight edge of the flat sides 34 and 35. When it is desired to haul the reel to the right, the center plug is pulled from the right also, and the reel, rotating in clockwise direction, the bushing then also passes away from the flat sides of the lever members. By the described construction, therefore, the bushing always is able to bear upon a curved surface of the plug, thus materially reducing friction, and eliminating any tendency of the plug to jam in the bushing and be rotated thereby.

When the reel has come to rest on the platform of the truck, the truck is started without releasing the tension in the hauling cables and the reel is bodily transported to its destination. When the truck is properly positioned in front thereof, with reference to the space which it is desired that the reel occupy the windlass is rotated in an opposite direction, thus lessening the tension in the winding cables 24 to permit the reel to roll slowly down the incline and to rest in the storage area allotted to it. When the reel has become stationary therein, the winding cables 24 may be slackened to any desired extent to permit an operator to manually cause the clevis bolt to slide to the right in the slots. Midway of the length of the two-way slot, the clevis bolt reaches the right hand end of the one-way slot and a continued movement thereof permits the rotation of the lever member 31 in a counter-clockwise direction, which disengages the hooked portion 40 thereof from the bushing and causes the lever members 30 and 31 to once more coincide, upon which the center plug may be withdrawn from the aperture of the reel. It will be understood that due to the tapered configuration of the lever members, their main bearing surfaces, with reference to the reel structure, consists of that portion immediately adjacent the common fulcrum 32 which is substantially cylindrical, thus insuring relative movement of the central bushing thereof with a minimum of friction, and permitting the free rotation of the reel with respect thereto when the plug is in the expanded engaged position.

By providing the angular displacement of the two sections of the two-way slot 36, it is possible not only to lock the hooked members in expanded positions by maintaining tension in the cable 24 to hold the clevis bolt in the left hand end of the slot 36, but, due to the fact that the one-way slot 38 is approximately one-half the length of the slot 36, the hooked members remain locked in the expanded position without any tension existing in the cables so long as the clevis pin 27 is not so forced against the right hand end of the one-way slot 38 as to move the bolt out of the left hand half of the two-way slot.

Although the invention has been described in connection with a particular embodiment, it is apparent that it is susceptible of advantageous employment in numerous embodiments and of numerous modifications and the invention should therefore be limited only by the scope of the appended claims.

What is claimed is:

1. In a reel handling apparatus, a reel center plug including slotted levers oppositely rotatable about a common fulcrum, hooked ends on the levers, and means engaging the slots of the levers for rotating the levers about the fulcrum to cause the hooked end to expand and to coincide so as to engage or release an inner surface of a reel face after insertion through the central aperture thereof.

2. In a reel center plug, a pair of levers having complemental hooked ends, a common fulcrum for the levers, each lever having an apertured section and a member extending through the apertured sections and movable to a plurality of positions therein and adapted when in one position to cause the levers to lockingly engage the reel and when in another position to permit disengagement from the reel.

3. In a material handling apparatus, a conveyance carrying a hauling cable, winding means thereon for the cable and a plug carried by the cable comprising a pair of slotted levers oppositely rotatable upon a common fulcrum and a clevis having a bolt slidable in the slots of the levers whereby the levers are held in expanded position when tension exists in the cable and rendered contractable when the tension is removed.

4. In a reel center plug, a body comprising a pair of pivotally united bell crank levers each provided at one end with a hook, the opposite end of one of the levers provided with an angular slot, the opposite end of the other lever formed with a straight slot, and a member slidably engaging the slots and cooperating therewith to move the hooked ends into substantially coinciding relation to pass through the central aperture of a reel face and thereafter to move the hook ends into expanded relation to be locked in the aperture against withdrawal therefrom.

5. In a reel center plug, a body comprising a pair of pivotally united levers each having a hook at one end and a slot near the other end, in combination with an actuating pin positioned slidably in both slots, the slots being so oriented and the levers being so formed that in one extreme position of the pin in the slots the levers are coincident on one side of their pivot and divergent on the other side while in the other extreme position of the pin this relation of the levers is substantially reversed.

In witness whereof, I hereunto subscribe my name this 26th day of December, A. D. 1929.

WILLIAM SCHROEDER.